Patented Dec. 10, 1940

2,224,359

UNITED STATES PATENT OFFICE 2,224,359

PRODUCTION OF TERPENIC PHENOL-ALDEHYDE RESIN

Israel Rosenblum, New York, N. Y.

No Drawing. Application February 24, 1937,
Serial No. 127,519

4 Claims. (Cl. 260—51)

The present invention relates to synthetic resins, and has for its general object to provide an improved process whereby a high yield of resinous material is obtained which is suitable for the manufacture of coating compositions of various kinds, and particularly of oil varnishes, and to the product obtained by such process.

More specifically, it is an object of the invention to provide an improved process for chemically incorporating terpenic material in a phenol-aldehyde resin. Other objects of the invention will appear from the following description thereof.

The present application is a continuation in part of my copending applications, Serial Nos. 594,379 and 751,419, filed February 20, 1932, and November 3, 1934, respectively.

According to the present invention, the halides and particularly the chlorides of acid producing elements are employed in a reaction involving the presence of a phenol and a terpene material. In one form of the invention the halide remains chemically bound in the final product; the process may however be so conducted that the halide is removed after the initial reaction between the phenol and the terpene material, with or without the aldehyde.

The halides most suitable for my process are chlorides which are liquid at room temperature, especially silicon tetrachloride, titanium tetrachloride and boron chloride. These chlorides appear to act more than merely as catalysts and seem to take part in the reaction. In fact, and particularly in the case of silicon chloride, the positive radical appears to be chemically combined with the phenol-terpene aldehyde resin. Thus, when phenol, dipentene, and silicon chloride are heated to a temperature of about 60° C., the phenol combines with the dipentene while the silicon becomes attached to the resulting complex phenol or to a condensate or polymer thereof, most probably to the phenol nucleus itself, hydrochloric acid being liberated. The product is a clear material, showing that the silicon is not present as $SiO_2$. Moreover, the silicon cannot be washed out, which shows that it is part of the phenol-dipentene complex. When this phenol-dipentene-silicon complex is condensed with formaldehyde a resinous material can be obtained which is soluble in varnish oils and in which the silicon is present in chemical combination. The yield of resin so obtained is unusually high.

With regard to the nature of the reaction between the phenol, dipentene and silicon chloride it is probable that the silicon chloride combines with the dipentene to form an addition product. This theory is supported by the fact that the addition of water to this reaction product does not liberate hydrochloric acid or cause precipitation of $SiO_2$, indicating that the silicon chloride is not present in the free condition. However, upon reaction between this addition product and a phenol, hydrochloric acid is liberated and this can be explained by assuming that the chlorine of the silicon chloride-dipentene addition product has reacted with one or more of the hydrogen atoms of the phenol molecule, the silicon becoming bound to the latter, probably directly to the nucleus. That silicon can become chemically united with a phenol is demonstrated by the violent reaction between silicon tetrachloride and phenol, wherein free chlorine and probably also some HCl are liberated, the silicon remaining attached to the phenol molecule.

Although the halides employed by me fume in the air and are decomposed by water, nevertheless resins obtained therewith are surprisingly stable toward water. Only after prolonged attack by water is silica precipitated out of a phenol-dipentene-silicon tetrachloride-formaldehyde resin, and in such case an oil-soluble resin remains which is composed of the addition and condensation product of the phenol, dipentene and formaldehyde. It is therefore possible to obtain resins containing and resins free from silicon. In the latter case condensation with the aldehyde is carried out in such a manner that the silicon is given an opportunity to precipitate as silicon dioxide. This can be most easily accomplished by conducting the reaction in the presence of water. On the other hand, when it is desired to retain the silicon (or equivalent element) in the final product, the reactions should be made to take place under as anhydrous conditions as possible, care being taken that any water formed during the reactions is immediately expelled.

The halides above referred to have the property of effecting combination between phenols and terpene compounds, including terpene hydrocarbons and their derivatives, including the terpene alcohols and various addition and substitution products of terpene hydrocarbons, there being formed new phenols which are stable in character and contain not only a substantial amount of terpene radical in the molecule but also a small proportion of silicon which represents the major part, if not all of the silicon originally present as $SiCl_4$. These complex phenols are highly valuable substances because on condensation with aldehydes and particularly formaldehyde, in the presence of a catalyst, they give highly satisfactory oil-soluble resins, varnishes containing such resins being characterized by their ability to yield quick setting, quick drying, durable and non-yellowing films.

In carrying out the invention the $SiCl_4$ (or equivalent halide) is preferably first dissolved in a part of the terpene material and is heated under reflux at about 100° C. A partial reaction takes place, the resulting solution representing a more convenient form of handling the $SiCl_4$, the latter being still in a highly active state. This solution is then mixed with the phenol and with additional terpene material in the desired proportion, the mixture being then slowly heated up to about 115° C. with vigorous stirring. A moderately exothermic reaction takes place. The mass is kept at about 115° for a period of about twelve hours, after which the temperature is raised, even up to 250° C. to remove uncombined phenol, terpene and other volatile material. The expulsion of the volatile matter can be facilitated by passing an inert gas through the mass, the volatile matter including HCl and also a small amount of water vapor. The silicon remains in the product to the extent of about 2 per cent or more, depending upon the proportions of the reacting materials. It is very probable that the silicon atom acts as a bond for joining together several phenol-terpene molecules.

The invention will be described in greater detail with the aid of the following examples which are presented for purposes of illustration only.

*Example 1.*—One mol (170 grams) of $SiCl_4$ are heated with two mols (272 grams) of dipentene at about 100° C. under reflux about two hours. The resulting solution, in which, as above stated, a partial reaction has taken place, is used as a convenient carrier of $SiCl_4$. The $SiCl_4$ can be used directly as such in the preparation of the phenol-terpene complex, but in such case more care is required to prevent hydration of the chloride and also a too-violent reaction with the phenol.

The following materials are then heated together:

| | Grams |
|---|---|
| Phenol | 188 |
| Dipentene | 100 |
| Dipentene-$SiCl_4$ complex | 60 | the temperature being slowly raised to about 115° C. The materials in this mixture are in the proportion of about two mols of phenol, one mol of dipentene (total) and one-eighth mol of $SiCl_4$. The temperature of 115° is maintained for about twelve hours, the mass being stirred and the escape of volatile material being expedited by means of a current of inert gas such as carbon dioxide or nitrogen. The heating is then continued and the temperature raised more rapidly to about 250° C. During this final heating the HCl that is formed together with unreacted phenol and terpene are expelled. A semi-solid plastic is obtained which contains phenol and terpene material chemically combined with each other in about equal proportions together with about 2% of silicon.

The phenol-dipentene-$SiCl_4$ complex may be condensed with formaldehyde in any known manner to produce an oil-soluble resinous material. The following procedure gives very satisfactory results:

100 grams of the complex, which is in a more or less plastic condition, 10 grams of paraformaldehyde and about ½% of zinc acetate based upon the weight of the complex are heated up to about 120° until the foaming subsides. The mass is then heated to a higher temperature in a current of inert gas, the final temperature being as high as 240–250° C.

When a material is obtained which yields a hard brittle resin at room temperature, the heating is stopped. The yield is about 100 grams and the acid number of the product is about 20. The resin is readily soluble in drying oils and with wood oil gives a varnish of good drying properties which produces a pale non-yellowing film.

*Example 2.*—150 grams of butyl phenol, 120 grams of dipentene and 30 grams of the dipentene-$SiCl_4$ complex obtained as in Example 1, are heated together, the temperature being gradually raised to about 105° C. The proportion of the reacting materials corresponds to approximately one mol each of butyl phenol and dipentene and $\frac{1}{16}$ mol of silicon chloride. The mass is kept at 105° for about twelve hours, during which time it is preferably stirred by passing an inert gas therethrough, so that volatile matter, including water vapor, is quickly removed. The temperature is then raised to about 240° C. to expel additional volatile material. About 280 grams of a clear, pale plastic is obtained. The analysis of the ash of this material shows 1.5% of silica, corresponding to a content of 0.7% of silicon in the butyl-phenol-terpene complex.

100 grams of this complex are then heated with 10 grams paraformaldehyde and 0.25 gram of zinc acetate at about 110–120° C. with good stirring. This proportion corresponds to equimolecular ratios of formaldehyde and butyl phenol. When the foaming has subsided the mass is heated to 250° C. until volatile unreacted material is expelled and a resin is obtained which is clear and brittle at room temperature. The acid value of the resin is about 25. It is compatible with other synthetic resins, with natural resins and with drying oils and produces with wood oil a gas-proof, quick-drying varnish which yields non-yellowing films.

Instead of the phenol and butyl phenol employed in Examples 1 and 2, other phenol homologues and also substituted phenols may be employed, and also mixtures of various phenols. The results obtained with these other phenols are in general similar to those described hereinabove. Thus cresols, amyl phenols, aromatic hydroxy acids, etc. may be used alone or together with ordinary phenol (hydroxybenzene).

The dipentene may be replaced, in whole or in part, by other terpenic substances such as turpentine, pinene, limonene, camphene and their addition and substitution products such as the chlorides and hydroxy compounds. The oxygen-containing terpenes, and particularly the alcohols or alcohol-containing essential oils, such as terpineol, borneol, cineol and pine oil ordinarily require special care to prevent separation of silicon by the action of water that may be formed.

The present invention contemplates also the production of resins from which the silicon or equivalent element is removed. This can be accomplished by heating the resins obtained according to the procedures above-described with water, to which some mineral acid may me added, the silicon being thus precipitated and there remains a resinous material which is clear and hard at room temperatures and whose solubilities are unaffected by the loss of the silicon. In these procedures terpene alcohols can be employed without the use of any special precautions and the silicon may be completely precipitated as $SiO_2$ during the reaction between the phenol, the dipentene-$SiCl_4$ complex and the terpene alcohol. The silicon tetrachloride may also be heated as such (i. e. not in the form of a solution or partial reaction product with dipentene), directly with the phenol and the terpene alcohol, the $SiCl_4$ facilitating the combination between the phenol and the terpene alcohol. After a separation of the $SiO_2$, the product is reacted with formaldehyde, as above-described. It will be obvious that in the absence of silicon in the intermediate product, the latter may be reacted with aqueous formaldehyde. If desired, a part of the aldehyde may be present during the reaction between the phenol, the terpene material and the inorganic chloride, but in general it is preferred to react the phenol, terpene material and chloride in the absence of any substantial amount of aldehyde, when it is desired to retain the positive radical of the chloride in the final resin. Where such positive radical is to be precipitated, the aldehyde may be present during the reaction between the phenol, terpene material and chloride; even in such case, however, better results are generally obtained by adding the aldehyde only after a substantial degree of reaction has taken place between the other reactants.

The silicon tetrachloride, as already indicated, may be replaced by similar water-unstable inorganic chlorides or mixtures of chlorides, such as $TiCl_4$, $BCl_3$ (which, like silicon tetrachloride are liquid at approximately room temperature and pressure) etc., the procedures being slightly varied where necessary to take account of the different physical characteristics of these other chlorides, as will be obvious to those skilled in the art. Thus, the reaction may be conducted under pressure to avoid loss of volatile chloride. In each case the titanium, boron, etc. may remain in the final resin, as above-described in connection with silicon, or it may be removed before or during or after the reaction with the aldehyde. In any case the chlorides act to effect a greater degree of combination between the terpene material and the phenol, thereby producing substances of higher molecular weight and increasing the yield of resin.

In certain instances it will be found that the complex resin containing the silicon or equivalent element in chemical combination resists attempts to precipitate the silicon or the like by the action of hot water. In such cases it will be found that the precipitation can be readily accomplished by adding a soluble salt, such as zinc acetate to the water.

Rosin, which is itself a terpene substance, may be employed in place of part or all of the terpene materials above mentioned. Other variations from the specific disclosures herein may be resorted to by those skilled in the art without departing from the spirit of the invention.

I claim:

1. The method of producing phenolic resins suitable for use in the manufacture of coating compositions which comprises heating and reacting dipentene with a silicon chloride capable of reacting therewith, reacting the resulting product with a phenol and with formaldehyde, and heating the resulting product with water to remove the silicon.

2. The method of producing phenolic resins suitable for use in the manufacture of coating compositions which comprises heating and reacting a terpene hydrocarbon with an inorganic chloride of an element of the group consisting of silicon, boron and titanium, and reacting the resulting product with a phenol and with an aldehyde.

3. The method of producing phenolic resins suitable for use in the manufacture of coating compositions which comprises heating and reacting a terpene hydrocarbon with an inorganic chloride of an element of the group consisting of silicon, boron and titanium, and reacting the resulting product with a phenol and with formaldehyde.

4. The method of producing phenolic resins suitable for use in the manufacture of coating compositions which comprises heating and reacting a terpene hydrocarbon with an inorganic chloride of an element of the group consisting of silicon, boron and titanium, reacting the resulting product with a phenol and with formaldehyde, and heating the resulting product with water to remove the element.

ISRAEL ROSENBLUM.